Patented Nov. 20, 1951

2,576,037

UNITED STATES PATENT OFFICE 2,576,037

SULFONYL FLUORIDES OF AMINO AZO DYESTUFFS

Robert Prescott Parker, Somerville, and Corris Mabelle Hofmann, Bound Brook, N. J., assignors to American Cyanamid Company, New York, N. Y., a corporation of Maine No Drawing. Application August 25, 1947, Serial No. 770,546

6 Claims. (Cl. 260—205)

This invention relates to dyestuffs of the cellulose acetate color type, more specifically to aminoazo dyestuffs which are free from groups conferring water solubility on the dyestuffs.

The water-insoluble dyestuffs of the present invention are characterized by the presence of at least one sulfonyl fluoride group. They may be represented by the following formula:

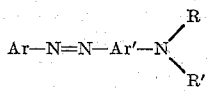

in which Ar is a radical of the benzene series and Ar' is a radical of the benzene and naphthalene series at least one of the radicals containing a sulfonyl fluoride group. Ar and Ar' may have other substituents so long as they are non-solubilizing and R and R' are selected from the group consisting of hydrogen, alkyl, arakyl, beta-hydroxylakyl, beta-alkoxy alkyl, and beta (beta-alkoxy) alkoxy alkyl groups.

It has been found that the water-insoluble dyestuffs of the present invention containing sulfonyl fluoride groups exhibit a high degree of solubility in cellulose acetate and also in synthetic resins of the vinyl halide-vinyl acetate copolymer type. This is particularly surprising because dyestuffs containing the most closely related group, namely the sulfonic acid group, are not soluble in these materials and cannot be used practically for dyeing them. The fact that the dyes of the present invention are soluble in both cellulose acetate and vinyl halide-vinyl acetate makes it possible to dye both types of material with the same dyestuff. For example, union goods containing the two materials may be dyed simultaneously, which is important commercially. The majority of cellulose acetate dyes are not suitable for dyeing all types of vinyl halide-vinyl acetate copolymers without special procedures. And so, the present invention opens up a new field in the dyeing of both of these materials.

The effect of the sulfonyl fluoride group is quite anomalous. Instead of having of having a consistent effect on the shade it exerts a strongly hypsochromic effect while with other dyes exactly the opposite effect is obtained. This is most unusual and the reason for the reversal of behavior with some dyes has not been determined and the present invention is not intended to be limited to any theory of why the same group behaves differently in different dyestuffs.

While a hypsochromic effect results the aminoazo dyestuffs produce dyeings of light shade and a high degree of brilliancy and superior fastness properties are generally noted regardless of the shade change. Where the sulfonyl fluoride group exerts a hypsochromic effect the practical advantage results that light shades are obtained from dyestuffs prepared from cheap and readily accessible intermediates.

Another property of the dyestuffs of the present invention which facilitates their use in dyeing cellulose acetate and other synthetic fibers is that they are readily dispersed in an extremely finely divided form. This is a necessary property as practically all processes for direct dyeing of cellulose acetate, vinyl halide-vinyl acetate, and the like, involve dye baths in which the insoluble dyestuff is dispersed in an aqueous medium in finely divided form. These baths are usually solutions of soap or similar compounds such as ligninsulfonates. Dispersion of the dyestuffs of the present invention may be facilitated by wet grinding the dyestuff in the presence of dispersing or deflocculating agents, such as for example disulfodinaphthylmethane, sodium salts of higher alkyl sulphuric acids, sodium alkyl naththalene sulfonate, and the like. The dispersed dyestuff produced by wet grinding can be added to the conventional soap bath and fine dispersion of a high degree of uniformity results.

While the present invention is not broadly restricted to any particular process of preparing the dyestuffs, they may be produced readily by coupling diazotized aminobenzene sulfonyl fluorides with aryl amines capable of coupling in a position para to the amino group. Both the diazo component and the coupling component should be free from solubilizing groups such as sulfonic and carboxylic acid groups. An alternative method is to couple diazotized aromatic amines with the aminobenzene sulfonyl fluorides capable of coupling in a position para to the amino group. The coupling reaction is preferably carried out in the presence of an acid binding substance. We have found that the products obtained by either of the two procedures described above are equally soluble in cellulose acetate. Apparently the improved properties of the present invention are obtained regardless of whether the sulfonyl fluoride group substitues the one or other or both groups. A very wide choice of dyestuffs is thus made possible.

Typical aminobenzene sulfonyl fluorides which may be used as diazo components in the present invention are the following: 3-aminobenzene sulfonyl fluoride, 4-aminobenzene sulfonyl fluoride, 3-amino-4-methyl benzene sulfonyl fluoride, 3- amino-4-chloro benzene sulfonyl fluoride, 3-amino-4-methoxy benzene sulfonyl fluoride, 4-amino-5-nitro benzene sulfonyl fluoride, 5-aminobenzene-1,3-disulfonyl fluoride, 3-amino-4-trifluoromethyl benzene sulfonyl fluoride; 3,3'-diamino-5,5'-di-fluorosulfonyl diphenyl sulfone; 4-amino diphenyl-2-sulfonyl fluoride and 2-phenoxy-5-aminobenzene sulfonyl fluoride.

Some typical coupling components for producing dyestuffs are as follows: 3-amino-4-methyl benzene sulfonyl fluoride, 3-aminobenzene sulfonyl fluoride, 3-amino-4-chloro benzene sulfonyl fluoride, 3-amino-4-methoxy benzene sulfonyl fluoride, 3-amino-4-trifluoromethyl benzene sulfonyl fluoride, N,N-di-(beta-hydroxyethyl) aniline, N,N-di-(beta-hydroxyethyl) meta-toluidine, N-ethyl-N-beta (beta-methoxy) ethxoy ethyl aniline, N,N-dimethyl aniline, alpha-naphthylamine, ortho-phenetidine, meta-toluidine, ortho-chloro-aniline, 2,5-dimethoxy aniline, N-beta-hydroxyethyl aniline, N-benzylaniline.

The dyestuffs described above contain the sulfonyl fluoride group either in the diazo component or the coupling component. It is, of course, possible to produce dyestuffs in which the sulfonyl fluoride group is present in both components and such dyestuffs are included within the scope of the invention.

The exact color of a particular dyestuff will, of course, vary. In general, the free dyestuff bases are orange to red pigments which are either insoluble in water or have only limited solubility. The amino group is capable of forming salts with strong mineral acids. These salts are generally deeper in color and some of them have appreciable solubility in water.

While the most important field of practical utility for the dyestuffs of the present invention lies in dyeing cellulose acetate, vinyl halide-vinyl acetate copolymers, and similar material, the invention is not intended to be limited to such use as it is also possible to dye other fibers or fabrics from similar baths. Thus, for example, some of the dyes may be used in dyeing basic nitrogenous fabrics such as wool.

The invention will be described more fully in conjunction with the following illustrated examples. All parts are by weight unless otherwise noted.

*Example 1*

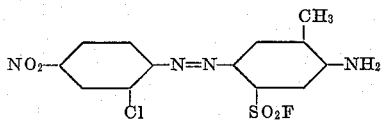

1.8 parts of 2-chlor-4-nitroaniline (93%) and a very small amount of the dibutyl ester of sodium sulfosuccinic acid are well pasted in 15 parts of water and 0.74 part of sodium nitrite is dissolved in the solution. This mixture is added to 5.5 parts of hydrochloric acid (1.19) diluted with an equal weight of water. Ice is then added to lower the temperature to 0° and the cold mixture is stirred for ½ hour. At this time, solid sulfamic acid is added to destroy excess sodium nitrite present and the solution is clarified. The clear diazo solution so obtained is added rapidly to a solution obtained by dissolving 2.1 parts of 3-amino-4-methyl benzene sulfonyl fluoride in 50 parts of water containing sufficient hydrochloric acid (1.19) to dissolve the amine. While stirring, solid sodium acetate is added until the solution is just basic against Congo red test paper. When coupling is complete, the yellow solid is collected on the filter, is washed with fresh water and is dried at 40° C.

*Example 2*

0.5 part of the dyestuff prepared as described in Example 1 is dispersed with the aid of a small amount of "Disulfodinaphthylmethane," in 5 parts of water and the dispersion is added to 95 parts of a ½% soap solution. The temperature of this dye bath is adjusted at 60° C. and 5 parts of cellulose acetate piece goods are added and are agitated in the soap bath as the temperature is raised to 80° C. The temperature of the dye bath is maintained at 80° C. until full color has developed whereupon the goods are removed from the dye bath, are well rinsed in lukewarm water, and dried. The cellulose acetate is levelly dyed a yellow shade.

When a dispersed dye bath is prepared as described immediately above and 5 parts of wool flannel previously well wet out are entered at 60° C. and maintained at this temperature until full color is developed, the wool is dyed a yellow color.

When a dyestuff which does not have the sulfonyl fluoride group and therefore possesses the following formula:

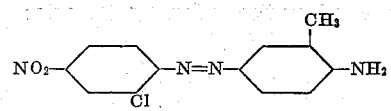

is prepared by the process described in Example 1 from o-chloro-p-nitroaniline and o-toluidine, it does not dye cellulose acetate yellow but on the contrary dyes it a red orange.

*Example 3*

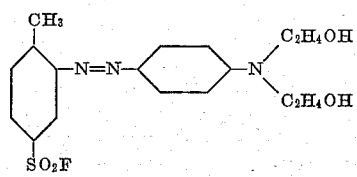

A solution of 4.75 parts of 3-amino-4-methyl benzene sulfonyl fluoride in 50 parts of water containing 7.5 parts of hydrochloric acid (1.19) is diazotized at 0° C. by the addition of 1.75 parts of sodium nitrite dissolved in 10 parts of water. This diazo solution is clarified and 5.4 parts of N-phenyl di (beta hydroxyethyl) amine are added. The coupling is completed by the gradual addition of solid sodium acetate until the mixture is just basic to Congo red test paper. The orange dye formed is filtered by suction, washed with water and dried at low temperature. When purified by crystallization from dilute ethyl alcohol, the 3-(4'-N,N-di-beta-hydroxyethyl-aminobenzene-azo)-4-methyl benzene sulfonyl fluoride melts at 159°–160° C.

*Example 4*

0.5 part of the dyestuff prepared as described in Example 3 is dispersed in 5 parts of water by grinding with a small amount of disulfodinaphthylmethane, and the dispersion is added to 95 parts of a ½% soap solution. The temperature of the dye bath is raised to 60° C. and 5 parts of cellulose acetate piece goods are added and are well agitated. The temperature is raised to and maintained at 80° C. until color development is full, whereupon the cloth is removed, well rinsed in warm water and dried. The cellulose acetate is levelly dyed a strong, brilliant orange of superior fastness properties.

When some other coupling components are substituted for the N-phenyl di-(beta-hydroxyethyl) amine employed in Example 3, other valuable new dyestuffs are described in the following table, together with the colors produced from their application on cellulose acetate by this procedure of Example 4.

| Dyestuff | Melting Point of Dyestuff | Dyeing on Cellulose Acetate |
| --- | --- | --- |
| | °C. | |
| 4-Methylbenzene sulfonyl fluoride azo N-phenyl mono-(beta hydroxyethyl) amine. | 91- 92 | orange. |
| 4-Methylbenzene sulfonyl fluoride azo N,N-diethylaniline. | 101-102 | yellow. |
| 4-Methylbenzene sulfonyl fluoride azo N-(m-tolyl)-di-(beta hydroxyethyl) amine. | 196-197 | orange. |

*Example 5*

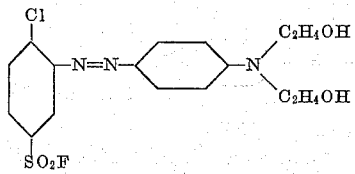

A mixture of 8.4 parts of 3-amino-4-chloro benzene sulfonyl fluoride, 39.8 parts of hydrochloric acid (1.19) and 125 parts of water is boiled until all of the base dissolves. The solution is cooled to 0° C. and 2.8 parts of sodium nitrite dissolved in 20 parts of water are added to complete diazotization. After clarification of the diazo solution, nine parts of phenyl diethanolamine are added. The coupling is completed by the addition of 200 parts of a 20% sodium acetate solution. The crude product after separation may be purified by crystallization from dilute alcohol and is a red, crystalline solid of melting point 136.5°–137.5° C. The dyestuff is, 3 - (4'N,N-dibetahydroxy - ethylaminobenzene azo)-4-chloro benzene sulfonyl fluoride.

It colors cellulose acetate fibers bright orange shades, when applied to the fiber in the manner described above in Example 4, whereas the dyestuff of the structure

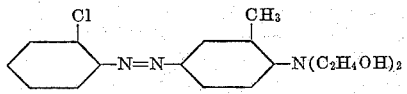

colors cellulose acetate yellow.

The 3-amino-4-chloro benzene sulfonyl fluoride employed above is prepared by the following procedure:

To a solution of 44.4 parts of potassium fluoride in 50 parts of water which is efficiently agitated are added 124.7 parts of 3 - nitro - 4 - chloro benzene. The reaction mixture is stirred at 130°–135° C. for 2½ hours, is cooled to room temperature, is diluted with 175 parts of water, and the crude 3-nitro-4-chloro benzene sulfonyl fluoride extracted with ether. After washing the ether extract with 2% aqueous sodium hydroxide solution and then with water, the extract is dried with anhydrous sodium sulfate, is filtered and the ether is removed by distillation. The residue is distilled under reduced pressure; 3-nitro-4-chloro benzene sulfonyl fluoride distilling at 138°–140° C. at five millimeters of mercury pressure. The distillate solidifies, the pure product melting at 58°–60° C.

62.2 parts of 3-nitro-4-chloro benzene sulfonyl fluoride in 208 parts of hydrochloric acid (1.19) are treated at 35°–40° C. portion-wise with 72 parts of tin. When reduction is complete, the tin double salt of 3-amino-4-chloro benzene sulfonyl fluoride hydrochloride is filtered off. The residue is stirred in 1,000 parts of water and the slurry is treated at 0°–5° C. with soda ash until the solution is basic to brilliant yellow test paper. The resulting slurry is extracted with ether, the ether extract is dried over sodium sulfate, and after filtration, the ether is removed by distillation. The residual 3-amino-4-chloro benzene sulfonyl fluoride may be further purified by crystallization from dilute alcohol solution and when pure, melts at 64°–66° C.

*Example 6*

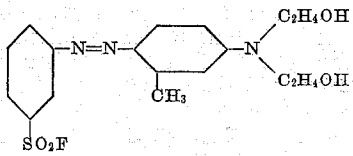

6.3 parts of 3-amino benzene sulfonyl fluoride hydrochloride are dissolved in 60 parts of water containing 5.95 parts of hydrochloric acid (1.19), and at low temperature the solution is diazotized by the addition of two parts of sodium nitrite dissolved in 12 parts of water. The diazo solution is clarified by filtration and 7 parts of N - meta - tolyl N,N - di - (beta - hydroxyethyl) - amine are added. The coupling is brought to completion by the addition of 5 parts of solid sodium acetate trihydrate. The red dye formed is filtered by suction, washed and dried at low temperature. When purified by crystallization from dilute ethyl alcohol, the 3-(2'-methyl-4'-N,N - dibeta - hydroxyethylaminobenzene azo)-benzene sulfonyl fluoride melts at 142°–143° C.

The dyestuff colors cellulose acetate fibers bright orange shades, when applied in the manner described above in Example 4.

*Example 7*

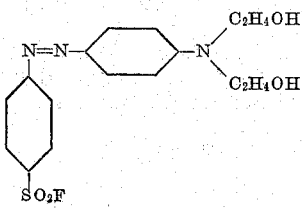

17.5 parts of 4-amino benzene sulfonyl fluoride are dissolved in 200 parts of water by the addition of 30 parts of hydrochloric acid (1.19) and at low temperature are diazotized by the addition of 6.9 parts of sodium nitrite dissolved in 40 parts of water. The diazo solution so obtained is clarified and at 0° C. it is treated with 21.6 parts of phenyl diethanolamine. The coupling is completed by the addition of solid sodium acetate until the mixture is just basic to Congo red test paper. The red dyestuff formed is filtered by suction, washed with water and dried at low temperature. When purified by crystallization from dilute ethyl alcohol, the 4-(4'-N,N-dibeta-hydroxyethylaminobenzene azo)-benzene sulfonyl fluoride melts at 150°–151° C.

It dyes cellulose acetate fibers a bright orange shade, when applied on the fibers in the manner described under Example 4.

The 4-amino benzene sulfonyl fluoride employed above is prepared in the following manner:

A 47° solution of potassium fluoride is prepared by dissolving 44.4 parts of potassium fluoride in 50 parts of water and to this solution 124 parts of 4-acetylamino benzene sulfonyl chloride are added portion-wise with efficient agitation. 100 parts of water are added to the reaction mixture which is then heated at 135°–140° C. for 2½ hours. After cooling the reaction mixture to 80° C., 200 parts of water are added and the reaction mixture is then stirred down to a temperature of 10° C. The solid which forms is filtered off and is well washed on the filter with cold water. The crude 4-amino benzene sulfonyl fluoride may be purified by crystallization from dilute hydrochloric acid and the free base may be liberated by treating a dilute hydrochloric acid solution with an alkaline carbonate. 4-amino benzene sulfonyl fluoride melts at 68°–69° C.

*Example 8*

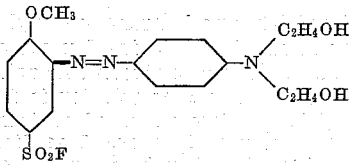

9.2 parts of 3-amino-4-methoxy benzene sulfonyl fluoride in 90 parts of water containing 13.5 parts of hydrochloric acid (1.19) are stirred to 0° C. and are diazotized by the addition of 3.1 parts of sodium nitrite dissolved in 18 parts of water. After clarification, the diazo solution is treated with 9.6 parts of phenyl diethanolamine. The coupling is completed by the addition of 13 parts of solid sodium acetate trihydrate. The red dyestuff is filtered, washed with water and dried at low temperature. After crystallization from hot methyl alcohol, the 3-(4'-N,N-dibeta-hydroxyethylaminobenzene azo)-4-methoxy benzene sulfonyl fluoride melts at 177°–178° C.

This dyestuff colors cellulose acetate fibers a bright yellow shade when applied by the procedure described under Example 4.

*Example 9*

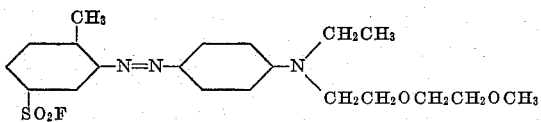

28.4 parts of 3-amino-4-methyl benzene sulfonyl fluoride are dissolved in 300 parts of water containing 45 parts of hydrochloric acid (1.19) and at low temperature the solution is diazotized by the addition of 10.4 parts of sodium nitrite dissolved in 60 parts of water. The filtered diazo solution is poured with stirring into a mixture of 35.5 parts of N-beta-(beta-methoxy) ethoxy ethyl -N-ethyl aniline, 22.5 parts of hydrochloric acid (1.19), 150 parts of water and 60 parts of diatomaceous earth. The coupling is brought to completion by the addition of solid sodium acetate until the mixture is just basic to Congo red test paper. The red dye absorbed on the diatomaceous earth is filtered off, washed with water and dried.

*Example 10*

2 parts of the dyestuff product prepared as described in Example 9 are stirred in 1 part of dibutyl phthalate and 38 parts of beta-hydroxy-ethyl ether. 2 parts of the resulting mixture are dispersed with the aid of 2 parts of a 5% "Gardinol" solution in 96 parts of water. The temperature of the dye bath is raised to 140° F. and 5 parts of a vinyl halide-vinyl acetate copolymer skein are added. The skein is removed, rinsed in luke warm water and dried. The vinyl halide-vinyl acetate copolymer fibers are levelly dyed an attractive golden yellow shade.

When two parts of the same dyestuff product as obtained in Example 9 are dispersed to form a dye bath as described in Example 4 and cellulose acetate piece goods are dyed at 80° C. the fabric is strongly dyed a bright orange shade.

*Example 11*

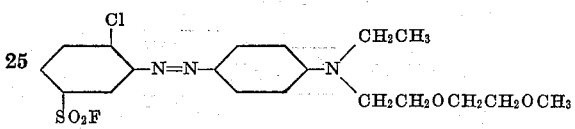

A mixture of 6.3 parts of 3-amino-4-chloro benzene sulfonyl fluoride, 29.8 parts of hydrochloric acid (1.19) and 100 parts of water is boiled until all of the base dissolves. The solution is cooled to 0° C. and 2.1 parts of sodium nitrite dissolved in 20 parts of water are added to complete diazotization. The filtered diazo solution is poured with stirring into a mixture of 7.1 parts of N-[beta-(beta-methoxyl) ethoxy-ethyl]-N-ethyl aniline, 4.75 parts of hydrochloric acid (1.19), 50 parts of water and 10 parts of diatomaceous earth. The coupling is brought to completion by the addition of solid sodium acetate until the mixture is just basic to Congo red test paper. The red dyestuff absorbed on the diatomaceous earth is filtered off, washed with water and dried.

The product dyes vinyl halide-vinyl acetate copolymer fibers a brilliant orange shade, when applied to the fibers in the manner described under Example 10.

*Example 12*

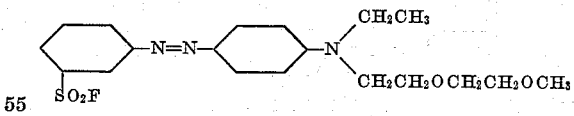

3.2 parts of 3-amino benzene sulfonyl fluoride hydrochloride are dissolved in 30 parts of water containing three parts of hydrochloric acid (1.19) and at low temperature, the solution is diazotized by the addition of one part of sodium nitrite dissolved in 6 parts of water. The filtered diazo solution is poured with stirring into a mixture of 3.6 parts N-[beta-(beta-methoxy) ethoxy ethyl]-N-ethyl aniline, 2.26 parts of hydrochloric acid (1.19), 15 parts of water, and 6 parts of diatomaceous earth. The coupling is brought to completion by the addition of solid sodium acetate until the mixture is no longer acid to Congo red test paper. The red product is filtered off, washed with water and dried.

This product colors vinyl halide-vinyl acetate copolymer fibers a brilliant yellow shade, when applied to the fibers by the procedure described in Example 10.

Example 13

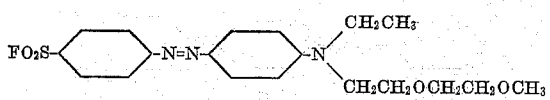

8.8 parts of 4-amino benzene sulfonyl fluoride are dissolved in 100 parts of the water by the addition of 14.9 parts of hydrochloric acid (1.19), and at low temperature are diazotized by the addition of 3.5 parts of sodium nitrite dissolved in 20 parts of water. The diazo solution is then clarified and poured with stirring into a mixture of 11.8 parts of N-[beta-(beta-methoxy) ethoxy ethyl]-N-ethyl aniline, 7.5 parts of hydrochloric acid (1.19), 50 parts of water and 20 parts of diatomaceous earth. The coupling is brought to completion by the addition of solid sodium acetate until the mixture is just basic to Congo red test paper. The red product is filtered off, washed with water and dried.

The product dyes vinyl halide-vinyl in the manner described in Example 10.

The product dyes cellulose acetate a very heavy shade of scarlet when applied according to the procedure described under Example 4.

Example 14

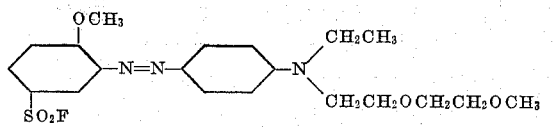

9.2 parts of 3-amino-4-methoxy benzene sulfonyl fluoride in 90 parts of water containing 13.5 parts of hydrochloric acid (1.19) are stirred to 0° C. and are diazotized by the addition of 3.1 parts of sodium nitrite dissolved in 18 parts of water. The clarified diazo solution is poured with stirring into a mixture of 10.8 parts of N-[beta-(beta-methoxy)-ethoxy ethyl]-N-ethyl aniline, 6.8 parts of hydrochloric acid (1.19), 45 parts of water, and 18 parts of diatomaceous earth. The coupling is brought to completion by the addition of solid sodium acetate until the mixture is just basic to Congo red test paper. The red product is filtered off, washed with water and dried.

This product dyes vinyl halide-vinyl acetate copolymer fibers a brilliant orange shade, when applied to the fibers by the procedure described in Example 10.

Example 15

A solution of 9.5 parts of 3-amino-4-methyl-benzene sulfonyl fluoride in 100 parts of water containing 14.9 parts of hydrochloric acid (1.19) is diazotized at 0° C. by the addition of 3.5 parts of sodium nitrite dissolved in 15 parts of water. The diazo solution resulting is clarified and is added to a solution of alpha-naphthylamine in 200 parts of water containing 5.5 parts of hydrochloric acid (1.19) and then cooling. When coupling is complete, the free dyestuff base is precipitated by addition of sodium acetate until the solution no longer gives an acid test to Congo red test paper. The precipitate is filtered off, is washed on the filter with water and is dried at 40° C.

When purified by crystallization from dilute ethanol, the 3-(4'-aminonaphthyl azo)-4-methyl benzene sulfonyl fluoride melts at 197°–200° C. and has the following formula given below.

Substitution of an equivalent molecular quantity of orthophenetidine for alpha-naphthylamine in this preparation produces an orange dyestuff which has the formula given below.

These two dyestuffs when applied to cellulose acetate according to the procedure described above in Example 4 produced brightly colored dyeings described below opposite the dyestuff formula:

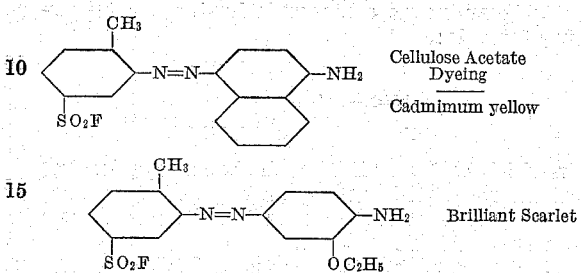

Cellulose Acetate Dyeing

Cadmimum yellow

Brilliant Scarlet

Example 16

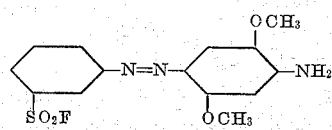

8.5 parts of 3-amino benzene sulfonyl fluoride hydrochloride stirred in 50 parts of water are dissolved by addition of 26.5 parts of 17% hydrochloric acid and at 0°-5° C. the solution is diazotized by addition of 2.8 parts of sodium nitrite dissolved in 10 parts of water. The diazo solution is clarified and the clear filtrate is slowly run into a chilled and stirred solution of 6.5 parts of 2,5-dimethoxy aniline in 80 parts of water containing 11 parts of 17% hydrochloric acid. Coupling is rapid with production of a reddish orange solid. Solid sodium acetate is then added until the solution is no longer acid when spotted on Congo red test paper. The resultant insoluble orange dyestuff is filtered off and is washed with water.

When purified by crystallization from 90% alcohol an orange-red crystallate is obtained.

When applied on cellulose acetate by the procedure of Example 4 a bright orange dyeing of reddish shade is obtained.

As shown ante, vinyl halide-vinyl acetate copolymers and cellulose acetate can be readily and effectively dyed with our new class of water-insoluble aminoazo dyes containing at least one sulfonyl fluoride group, particularly the water-insoluble aminoazo compounds having the formula:

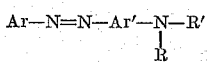

in which Ar is a radical of the benzene series free of water solubilizing groups and substituted by at least one sulfonyl fluoride group, Ar' is a para-arylene radical of the benzene series free from water solubilizing groups, R and R' are radicals selected from the group consisting of lower alkyl, aralkyl of the benzene series, beta-hydroxy alkyl, beta-alkoxy alkyl and beta-(beta-alkoxy) alkoxy alkyl groups.

We claim:

1. As new chemical compounds, the water-insoluble aminoazo compounds having the following formula:

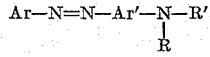

in which Ar is a radical of the benzene series free of water-solubilizing groups and substituted by at least one sulfonyl fluoride group, Ar' is a para-arylene radical of the benzene series free from water-solubilizing groups, R and R' are radicals selected from the group consisting of lower alkyl, aralkyl of the benzene series, beta-hydroxy alkyl, beta-alkoxy alkyl, and beta-(beta-alkoxy) alkoxy alkyl groups.

2. As new chemical compounds, the water-insoluble aminoazo compounds having the following formula:

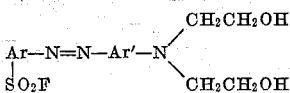

in which Ar is a radical of the benzene series free of water-solubilizing groups and Ar' is a para-arylene radical of the benzene series free from water-solubilizing groups.

3. As new chemical compounds, the water-insoluble aminoazo compounds having the following formula:

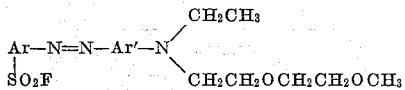

in which Ar is a radical of the benzene series free of water-solubilizing groups and Ar' is a para-arylene radical of the benzene series free from water solubilizing groups.

4. The azo dyestuff having the formula:

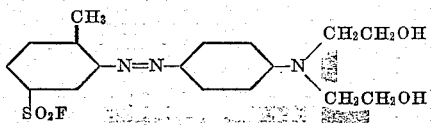

5. The azo dyestuff having the formula:

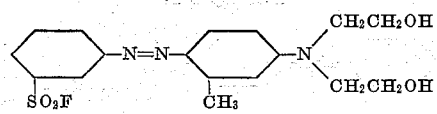

6. The azo dyestuff having the formula:

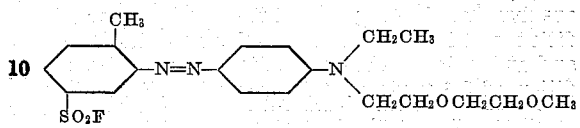

ROBERT PRESCOTT PARKER.
CORRIS MABELLE HOFMANN.

REFERENCES CITED

The following references are of record in the file of this patent:

UNITED STATES PATENTS

| Number | Name | Date |
|---|---|---|
| 2,151,857 | Manz et al. | Mar. 28, 1939 |
| 2,154,186 | Schweitzer et al. | Apr. 11, 1939 |
| 2,266,142 | Adams | Dec. 16, 1941 |
| 2,347,704 | McNally et al. | May 2, 1944 |
| 2,427,995 | Parker et al. | Sept. 23, 1947 |

FOREIGN PATENTS

| Number | Country | Date |
|---|---|---|
| 155,073 | Austria | Nov. 25, 1938 |